Patented May 17, 1932

1,858,344

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

MANUFACTURE OF MERCAPTO-ARYL-THIAZOLES

No Drawing. Application filed October 11, 1928. Serial No. 311,979.

The present invention relates to a new process for the manufacture of mercapto-benzo-thiazoles. More particularly, the invention relates to the manufacture of mercapto-benzo-thiazoles by reacting an aryl-aminobenzothiazole with hydrogen sulfid, whereby a product of exceptionally high quality is obtained.

An example of the preferred manner in which the invention may be carried into effect is hereinafter shown wherein mercapto-benzo-thiazole is prepared from anilino-benzo-thiazole by reacting it with hydrogen sulfid according to the following equation:

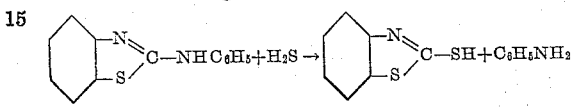

Approximately 100 parts of anilino-benzo-thiazole were placed in a container, capable of being tightly closed, to which was attached a pressure gauge. Hydrogen sulfid gas was then added to the contents of the container until the pressure gauge registered a pressure of about 200 pounds per square inch. After the addition of the hydrogen sulfid gas, the container was closed and the contents heated for a period of time and at a temperature sufficiently high to complete the reaction at the pressure developed. The time of heating and the temperatures employed were preferably about two to three hours at approximately 225° C. to 300° C. respectively. The pressure developed varied between approximately 200 and 400 pounds per square inch. In convenient or desirable, different periods of heating and/or higher temperatures and pressures may be employed. The heating was continued until at constant temperature there was no decrease in pressure, thus showing that no hydrogen sulfid gas was uniting with the anilino-benzo-thiazole and consequently the reaction was complete. The contents of the reactor were then allowed to cool and the excess hydrogen sulfid released. The mercapto-benzo-thiazole thus prepared is isolated preferably according to either of the following methods: (1) The aniline formed as a by-product is steam distilled from the reaction product, and the residue extracted with approximately 13% sodium hydroxide solution, to dissolve the mercapto-benzo-thiazole, thus separating it from any small amounts of unreacted anilino-benzo-thiazole that may be present. The caustic extract is then triturated, filtered and washed with water, after which dilute hydrochloric acid is added to the filtrate to reprecipitate the mercapto-benzo-thiazole. An alternative purification method is as follows.

(2) The reaction product of anilido-benzothiazole and hydrogen sulfid obtained as described, is treated with dilute hydrochloric acid to remove the aniline formed as a by-product, triturated, filtered and the precipitate washed with water. The mercapto-benzo-thiazole is then isolated from the precipitate by extracting with approximately 13% sodium hydroxide solution. The extract is filtered off and the precipitate washed with water, after which dilute hydrochloric acid is added to the filtrate to precipitate the mercapto-benzo-thiazole. The mercapto-benzo-thiazole thus obtained, after drying, melted at 174 to 175° C.

On further purifying this product by dissolving in sodium carbonate solution, filtering and reprecipitating with dilute hydrochloric acid, mercapto-benzo-thiazole having a purity of substantially 100% was obtained.

In a manner analogous to that hereinbefore described, anilino-tolyl-thiazole, anilino-xylyl-thiazole, toluido-methyl-benzothiazole and xylido-dimethyl-benzothiazole react with hydrogen sulfid to form the corresponding mercapto-aryl-thiazoles.

Having thus described the invention, it is understood not to be limited to the temperatures, pressures, etc. set forth, but is limited solely by the claims attached hereto as part of this specification.

What is claimed is:

1. The process for the preparation of a mercapto-benzo-thiazole comprising the reaction between an arylamino-benzo-thiazole and hydrogen sulfid under superatmospheric pressure.

2. The process for the preparation of mercapto-benzo-thiazole comprising the reaction between anilino-benzo-thiazole and hydrogen sulfid under a pressure of 200 to 400 pounds per square inch.

3. The process for the preparation of mercapto-benzo-thiazole comprising the reaction between anilino-benzo-thiazole and hydrogen sulfid under superatmospheric pressure.

4. The process for the preparation of mercapto-benzo-thiazole comprising the heating of anilino-benzo-thiazole and hydrogen sulfid gas at a temperature varying between about 225° C. and 300° C. and a pressure above 175 pounds per square inch.

5. The process for the preparation of a mercapto-benzo-thiazole comprising the heating of an anilino-benzo-thiazole and hydrogen sulfid under superatmospheric pressure.

In testimony whereof I hereunto affix my signature.

WINFIELD SCOTT.